Feb. 24, 1970  C. A. GRANTOM  3,497,244
SWIVEL WITH ADJUSTABLE PACKING
Filed Feb. 3, 1969
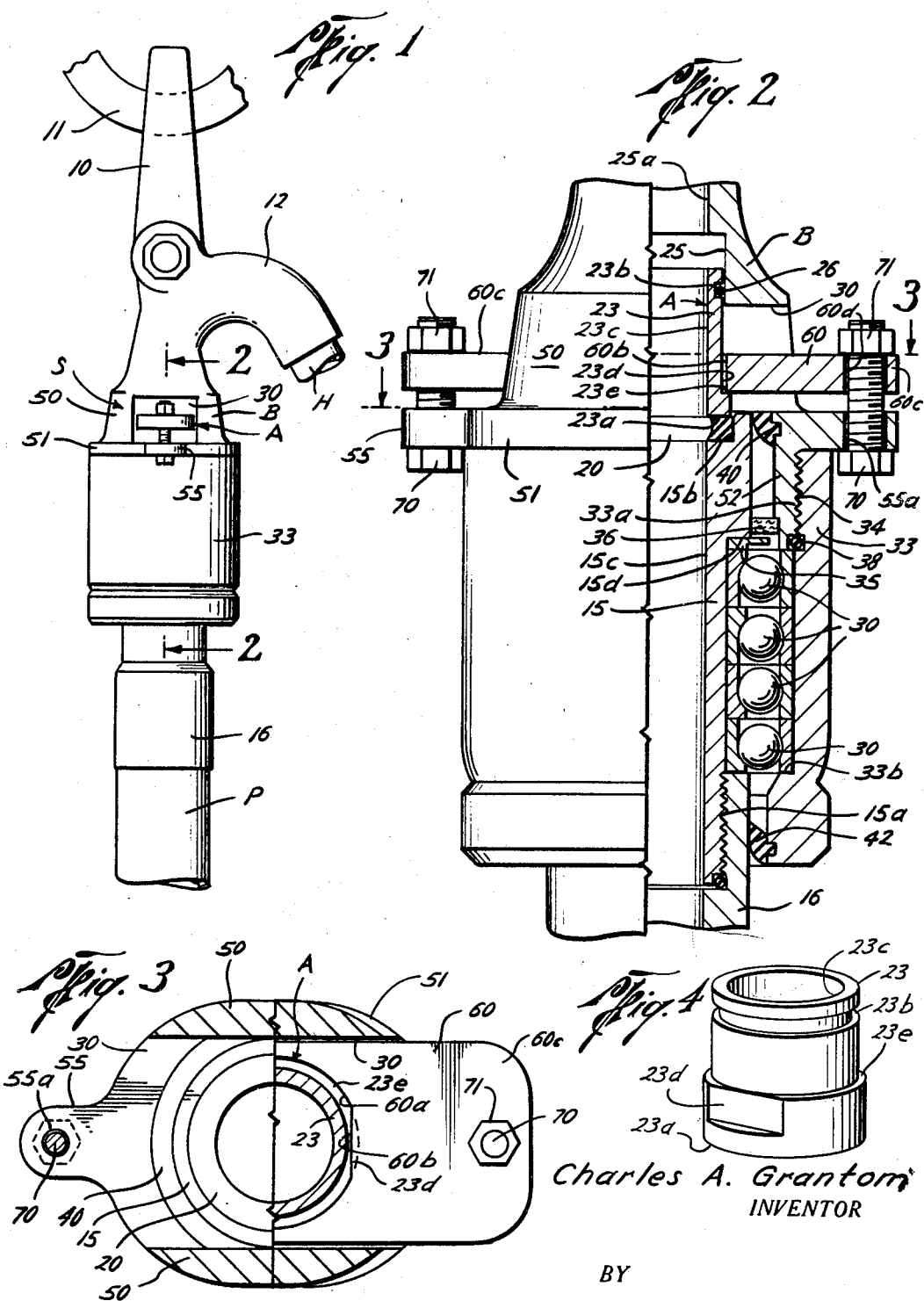
Charles A. Grantom
INVENTOR
BY
Hayden Pravel Wilson & Matthews
ATTORNEYS

United States Patent Office 3,497,244
Patented Feb. 24, 1970

3,497,244
SWIVEL WITH ADJUSTABLE PACKING
Charles A. Grantom, Houston, Tex., assignor to King
  Oil Tools, a corporation of Texas
Filed Feb. 3, 1969, Ser. No. 795,952
Int. Cl. F16b 55/00, 55/10
U.S. Cl. 285—16                                    8 Claims

ABSTRACT OF THE DISCLOSURE

A swivel having an adjustable packing which has a minimum of moving parts and a simplified construction to assure operability of the packing even after the swivel has been out of use for a prolonged period of time and to facilitate replacement of the packing in the field.

BACKGROUND OF THE INVENTION

The field of this invention is swivel adapted for well drilling apparatus.

In my U.S. patent application, Ser. No. 731,566, filed May 23, 1968, now issued as U.S. Patent No. 3,433,488, a self-adjusting packing for swivels is disclosed. Such self-adjusting packing is especially suitable for conditions such as usually are present in connection with water well drilling wherein the well pressure in a particular well does not vary appreciably. Also, due to the relatively complex structure of such self-adjusting packing, care must be exercised to be certain the packing is functioning properly if it has been out of use for a prolonged period of time.

SUMMARY OF THE INVENTION

The present invention relates to a swivel having a replaceable packing, wherein a minimum of parts are utilized for simplicity in the replacement of the packing and for providing a more positive assurance of effective sealing by the packing even after prolonged periods of inactivity of the swivel.

BRIEF DESCRIPTION OF THE DRAWING

FIG. 1 is an elevation of the apparatus of this invention;

FIG. 2 is a view, partly in elevation and partly in section, taken on line 2—2 of FIG. 1; and FIG. 3 is a cross-sectional view taken on line 3—3 of FIG. 2; and FIG. 4 is an isometric view of the wear bushing of this invention.

DESCRIPTION OF THE PREFERRED EMBODIMENT

In the drawing, the letter S designated generally the swivel of this invention which is especially adapted for use in connection with well drilling apparatus. The swivel S is shown as having a conventional bail 10 at its upper end which is adapted to be supported on a hook 11 (a portion of which is shown in FIG. 1) of a conventional elevator in a well derrick (not shown). Fluid such as drilling mud is introduced into a conventional gooseneck 12 which forms a part of the upper stationary body or section B through a hose H or any other suitable fluid conductor extending to a mud pump or other source of fluid under pressure (not shown). The lower portion of the swivel S is connected to drill pipe P, a portion of which is shown in FIG. 1. The pipe P is connected to a spindle 15 which preferably has a lower adaptor portion 16 threadedly connected thereto at threads 15a (FIG. 2).

The present invention has an improved packing assembly A for the swivel S which includes a packing ring or annular packing 20 formed of rubber or other resilient sealing material. The packing assembly also includes a metallic wear bushing 23 which is preferably formed of steel or other relatively strong material.

The annular packing 20 is removably postioned in an annular recess 15b formed near the upper end of the spindle 15. The lower annular surface 23a of the wear bushing 23 is in engagement with the upper surface 20a of the packing 20 when the assembly A is in position for providing a fluid type seal between the spindle 15 and the wear bushing 23, as will be explained.

In the preferred form of the invention, the wear bushing 23 extends upwardly into a recess 25 formed in the stationary section B, and an O-ring 26 formed of rubber or other suitable material is disposed between the external surface of the wear bushing 23 and the surface of the bore of the recess 25. Preferably, the O-ring is carried in an annular recess 23b formed near the upper end of the wear bushing 23. The wear bushing 23 is longitudinally slidable in the stationary section B and the recess 25 is of sufficient length to permit the movement upwardly of the bushing 23 a sufficient distance to accomplish the removal of the packing 20 through a window 30 in the stationary body 20, as will be explained more fully.

It is to be noted that the bore 15c of the spindle 15 is in substantial alignment with the bore 23c of the wear bushing 23, and likewise with the bore 25a above the recess 25 in the stationary section B. By reason of such alignment of the bores, there is substantially unobstructed flow of the fluid such as drilling mud from the gooseneck 12 downwardly through the spindle 15 and then into the pipe P therebelow.

The spindle 15 may be mounted on the stationary section B in any suitable manner, but preferably the spindle 15 is mounted so that it may be dropped downwardly to separate from the stationary section B if it should be desired to remove the wear bushing 23 for replacement or repair, as will be more fully explained. As shown in FIG. 2 in particular, the spindle 15 is supported for rotation on conventional ball bearings 30 which in turn are supported by a bearing housing 33. The bearing housing 33 has internal threads 33a which are in threaded engagement with external threads 34 on the lower portion of the stationary section or body B. It will be noted that the bearing housing 33 has an annular shoulder 33b which supports the outer rim of the bearings 30, and the spindle 15 has an external annular shoulder 15d which is engaged by the inner portion of the upper bearing 30. In the preferred form of the invention, a shield ring 35 is in position between the uppermost bearing 30 and the shoulder surface 15d of the spindle 15, but in any event, the spindle 15 is thus supported by the bearings 30 and the bearing housing 33 through the threaded connection provided by the threads 33a and 34. A shield seal 36 formed of felt or similar material is disposed above the shield 35 for assisting in retaining lubricant therein. To further lock the bearing housing 33 to the bearings 30, a conventional split ring 38 is disposed between the housing 33 and the upper end of the uppermost bearing 30.

An upper annular housing seal 40 formed of rubber or other similar resilient material is carried by the stationary section B near the upper end of the spindle 15. A similar housing seal 42 is carried by the lower end of the bearing housing 33 and is preferably in engagement with the lower portion 16 of the spindle 15. Such seals 40 and 42 serve to prevent fluids from entering the bearings 30.

The window 30 which is formed in the stationary section B extends laterally through such section B and is in communication with the bore of such section B where wear bushing 23 is normally disposed. The stationary section or body B extends downwardly on both sides thereof and forms supporting portions 50 which merge with an annularly extending rim 51 and a downwardly extending body portion 52 (FIG. 2). A pair of flanges 55 extend outwardly from the rim 51 and are disposed on opposite sides of the window 30.

A clamp plate 60 having a central opening 60a for receiving the wear bushing 23 is constructed so that it is slightly smaller in width than the window 30 for movement upwardly and downwardly in the window 30, as will be more evident hereinafter. The opening 60a in the plate 60 preferably has a pair of diametrically disposed flat surfaces 60b each of which mates with a corresponding flat surface 23d on the external surface of the wear bushing 23 to prevent the wear bushing 23 from rotating.

For applying clamping pressure to the packing 20, the wear bushing has an externally formed shoulder 23e which is engaged by the lower surface of the clamp plate 60 in proximity to the flat surfaces 60b (FIG. 3). The ends 60c of the plate 60 extend outwardly so as to be disposed over the flanges 55, and suitable bolt openings 60d in the plate 60 are in alignment with similar openings 55a in the flanges 55. Removable adjustable means such as bolts 70 with nuts 71 thereon are disposed in such openings 55a and 60d. By tightening the nuts 71, the clamp plate 60 may be urged downwardly to thereby urge the wear bushing 23 downwardly for compressing the packing ring 20 and to apply sufficient compression or pressure thereto to prevent leakage between the packing 20 and the wear bushing 23 even though relatively high well pressures are experienced during use of the swivel S. Thus, in the drilling of relatively deep oil or gas wells, the fluid pressure within the swivel S may be extremely high and it is therefore possible with the present invention to increase the pressure on the packing 20 to prevent leakage even though such pressure exists within the swivel S. This may be done simply and quickly by any inexperienced person in the field by simply tightening the nuts 71 until the leakage is under control.

In the operation or use of the swivel S of this invention, the packing 20 may be readily replaced in the field without special tools by simply loosening the nuts 71 a sufficient amount to permit a movement of the clamp 60 upwardly and the wear busing 23 upwardly to expose the packing 20 through window 30. With the bolts 70 of the length illustrated in the drawings, the nuts 71 would be removed entirely and the clamp plate 60 could then be moved to the uppermost part of the window 30 so that the wear bushing 23 could likewise be moved upwardly its full extent in the recess 25 so as to more readily reach the packing 20 with a screwdriver or even a person's hand which may extend to the packing 20 through the window 30. A new packing may be inserted for the old packing 20 and then the wear bushing 23 repositioned in contact with the packing 20. The clamp plate 60 is then re-engaged with the outer shoulder 23e and the bolts 70 and the nuts 71 are reinserted and are tightened to apply a desired amount of pressure on the new packing 20. The extent of such pressure will depend upon the anticipated operating conditions for the fluid which will pass through the swivel S.

Although it ordinarily is not necessary to replace or remove the wear bushing 23, should this need arise, the wear bushing 23 can be removed. Such removal is accomplished by unthreading the bearing housing 33 at the threaded connection provided by the threads 33a, 34, which permits a lowering of the bearing housing 33, bearings 30 and spindle 15 relative to the stationary section B. With the spindle 15 thus lowered, the bushing 23 may be dropped downwardly out of the then opened lower end of the stationary housing B and a new bushing 23 may be inserted in its place. The reassembly of the swivel S then merely involves a reconnection of the threads 33a, 34 and suitable adjusting of the pressure on the clamp plate 60 and thus on the wear bushing 23 by adjusting the nuts 71.

The foregoing disclosure and description of the invention are illustrative and explanatory thereof, and various changes in the size, shape, and materials as well as in the details of the illustrated construction may be made without departing from the spirit of the invention.

What is claimed is:
1. A well swivel, comprising:
 (a) a stationary section having a wall defining a longitudinal bore;
 (b) said stationary section having a window extending laterally therethrough and providing communication with said longitudinal bore;
 (c) a movable spindle having a wall defining a longitudinal bore;
 (d) bearing means mounting said spindle on said stationary section for rotation relative thereto;
 (e) an annular shoulder in the bore wall of said spindle;
 (f) an annular packing disposed on said annular shoulder;
 (g) a wear bushing slidably disposed in said longitudinal bore of said sationary section and engaging said packing to provide a fluid-tight seal between said wear bushing and said spindle;
 (h) seal means between said wear bushing and said bore wall of said stationary section providing a fluid-tight seal therebetween; and
 (i) clamp means extending from the exterior of said stationary section through said window and engaging said wear bushing and clamping said wear bushing in engagement with said packing for forming the fluid-tight seal between said wear bushing and said spindle.
2. The structure set forth in claim 1, including:
 (a) retaining means adjustably mounting said clamp means on said stationary section for adjusting the pressure exerted on said wear bushing by said clamp means for thereby adjusting the pressure on the packing.
3. The structure set forth in claim 1, wherein:
 (a) said wear bushing is longitudinally slidable in said bore of said stationary section away from said packing upon a loosening of the clamping pressure on said clamp means to expose said packing for enabling the removal thereof through said window.
4. The structure set forth in claim 1, wherein said bearing means includes:
 (a) a bearing housing removably secured to said stationary section;
 (b) bearings between said bearing housing and said spindle;
 (c) means on said bearing housing for supporting said bearings; and
 (d) means on said bearings for supporting said spindle, whereby a disconnection of said bearing housing from said stationary section permits a separation of said spindle from said stationary section to thereby expose said wear bushing for removal from said longitudinal bore of said stationary section.
5. The structure set forth in claim 1, including:
 (a) co-acting means on said wear bushing and said clamp means for preventing rotation of said wear bushing during the rotation of said spindle.
6. The structure set forth in claim 1, wherein:
 (a) said clamp means includes:
  (1) a clamp plate having an opening through which said wear bushing extends;
  (2) said clamp plate having its ends projecting laterally from said windows; and
 (b) said retaining means includes:
  (1) flanges projecting outwardly from said stationary section; and
  (2) connecting bolts and nuts extending through said flanges and said ends of said clamp plate for adjustably and releasably securing said clamp plate to said stationary section.

7. The structure set forth in claim 6, wherein:
(a) said clamp plate and said wear bushing having mating flat surfaces whereby said clamp plate prevents said wear bushing from rotating.

8. The structure set forth in claim 1, wherein:
(a) the bore of said wear bushing and the bore of said spindle are substantially in alignment with others to provide an unobstructed passage through the swivel.

References Cited

UNITED STATES PATENTS

| | | | |
|---|---|---|---|
| 1,946,456 | 2/1934 | Day | 285—281 |
| 2,237,715 | 4/1941 | Shaw et al. | 285—31 |
| 2,501,680 | 3/1950 | King | 285—98 |
| 3,002,769 | 10/1961 | Deubler et al. | 285—98 X |

DAVID J. WILLIAMOWSKY, Primary Examiner

DAVE W. AROLA, Assistant Examiner

U.S. Cl. X.R.

285—98, 276